(12) United States Patent
Asai

(10) Patent No.: US 10,440,289 B2
(45) Date of Patent: Oct. 8, 2019

(54) AUDIO/VIDEO OUTPUT DEVICE

(71) Applicant: Funai Electric Co., Ltd., Daito, Osaka (JP)

(72) Inventor: Tsutomu Asai, Hirakata (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/986,904

(22) Filed: May 23, 2018

(65) Prior Publication Data

US 2018/0376077 A1 Dec. 27, 2018

(30) Foreign Application Priority Data

Jun. 21, 2017 (JP) ................................. 2017-121037

(51) Int. Cl.
| | |
|---|---|
| *H04N 5/268* | (2006.01) |
| *G09G 5/00* | (2006.01) |
| *H04N 21/4363* | (2011.01) |
| *H04N 21/44* | (2011.01) |
| *H04N 5/775* | (2006.01) |
| *H04N 7/01* | (2006.01) |

(52) U.S. Cl.
CPC ............ *H04N 5/268* (2013.01); *G09G 5/003* (2013.01); *G09G 5/005* (2013.01); *G09G 5/006* (2013.01); *H04N 5/775* (2013.01); *H04N 7/0117* (2013.01); *H04N 21/43632* (2013.01); *H04N 21/43635* (2013.01); *H04N 21/44004* (2013.01); *G09G 2370/12* (2013.01); *G09G 2370/20* (2013.01); *G09G 2370/22* (2013.01)

(58) Field of Classification Search
CPC ...... H04N 5/268; H04N 5/775; H04N 7/0117; H04N 21/43632; H04N 21/53635; H04N 21/44004; G09G 5/003; G09G 5/005; G09G 5/006; G09G 2370/12; G09G 2370/20; G09G 2370/22
USPC ......................................................... 348/441
See application file for complete search history.

(56) References Cited

U.S. PATENT DOCUMENTS

| | | | | |
|---|---|---|---|---|
| 2006/0089735 A1* | 4/2006 | Atkinson | ................. | H04R 5/04 700/94 |
| 2008/0285951 A1* | 11/2008 | Takahashi | .............. | G11B 27/10 386/338 |
| 2010/0239233 A1* | 9/2010 | Yeh | .......................... | H04N 5/76 386/291 |

(Continued)

FOREIGN PATENT DOCUMENTS

| | | |
|---|---|---|
| WO | 2013/099369 A1 | 7/2013 |
| WO | 2016/060447 A2 | 4/2016 |

OTHER PUBLICATIONS

The extended European search report for the corresponding European application No. 18175609.9, dated Nov. 20, 2018.

*Primary Examiner* — Michael Lee
(74) *Attorney, Agent, or Firm* — Global IP Counselors, LLP

(57) ABSTRACT

An audio/video output device includes a first output component for video and audio output, a second output component for audio output, a video memory and a controller. The video memory stores video signal. The controller allocates at least part of an area of the video memory to the second output component in response to determining that an external device connected to the second output component supports video input.

18 Claims, 9 Drawing Sheets

(56) References Cited

U.S. PATENT DOCUMENTS

| | | | | |
|---|---|---|---|---|
| 2011/0157308 A1* | 6/2011 | Mansho | ........... | H04N 21/43632 |
| | | | | 348/43 |
| 2012/0123267 A1* | 5/2012 | Dow | ........................ | A61B 8/02 |
| | | | | 600/443 |
| 2012/0236949 A1* | 9/2012 | Keating | ............. | H04N 21/4122 |
| | | | | 375/259 |
| 2013/0283333 A1* | 10/2013 | Sato | ..................... | H04N 21/632 |
| | | | | 725/127 |
| 2017/0006336 A1 | 1/2017 | Lee et al. | | |

* cited by examiner

| VIDEO OUTPUT FORMAT SETTING | SETTING PARTICULARS |
|---|---|
| 1 | 480P 60Hz |
| 2 | 720P 60Hz |
| 3 | 1080I 60Hz |
| 4 | 1080P 60Hz |
| 5 | 4K 30Hz |
| 6 | 4K 60Hz |

*FIG. 6*

AUDIO/VIDEO OUTPUT DEVICE

CROSS-REFERENCE TO RELATED APPLICATIONS

This application claims priority to Japanese Patent Application No. 2017-121037 filed on Jun. 21, 2017. The entire disclosure of Japanese Patent Application No. 2017-121037 is hereby incorporated herein by reference.

BACKGROUND

Field of the Invention

This invention generally relates to an audio/video output device.

Background Information

HDMI™ (high-definition multimedia interface) is a conventional standard for transmitting video and audio as digital signals. The HDMI system is made up of a source device, a sink device, and an HDMI cable. The source device is a device on the side that outputs video and audio. The sink device is a device on the side where video and audio are inputted. The HDMI cable is a cable that connects these devices. An example of a display device related to HDMI is disclosed in International Publication No. WO 2013/099369 (Patent Literature 1), for example.

In addition to a normal HDMI port for outputting video and audio, some source devices have a dedicated audio HDMI port for outputting just audio (out of the video and audio).

SUMMARY

With the above-mentioned source device, a display device (a television set, a monitor, or the like) can be mistakenly connected as a sink device to the dedicated audio HDMI port. In this case, since no video can be outputted from the dedicated audio HDMI port, no video is displayed on the display device. In particular, an HDMI port is often located on the back of a device. Thus, in many cases, when connecting the HDMI cable to the HDMI port after installing the device, the user has to make the connection by feel, and the user does not visually check that the port is a dedicated audio HDMI port. Therefore, there is a case in which the user does not notice that the display device is mistakenly connected to the dedicated audio HDMI port. As a result, the user can erroneously conclude that a malfunction has occurred in the device due to the fact that no video is displayed on the display device.

Also, by blocking off the dedicated audio HDMI port with a sticker, the user can tell that the port with the sticker is a dedicated audio HDMI port. However, even in that case, once the sticker is peeled off, then it is difficult to tell which port is a dedicated audio HDMI port, and the user can accidentally connect a display device to the dedicated audio HDMI port.

Patent Literature 1 is conceived for easily and correctly connecting a plurality of HDMI cables between a display device and a source device. However, Patent Literature 1 is not directed to dealing with a problem encountered with a source device having a dedicated audio HDMI port.

One object of the present disclosure is to provide an audio/video output device with which user convenience is improved in a configuration having an output component dedicated to audio alone.

In view of the state of the known technology and in accordance with a first aspect, an audio/video output device comprises a first output component for video and audio output, a second output component for audio output, a video memory, and a controller. The video memory stores video signal. The controller allocates at least part of an area of the video memory to the second output component in response to determining that an external device connected to the second output component supports video input.

BRIEF DESCRIPTION OF THE DRAWINGS

Referring now to the attached drawings which form a part of this original disclosure:

FIG. 6 is a diagram showing an example of a video output format table;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Here, a system using HDMI™ (High-Definition Multimedia Interface) will be described as an example of an audio/video transmission system.

1. First Embodiment 1.1 Device Configuration

Figure 1:
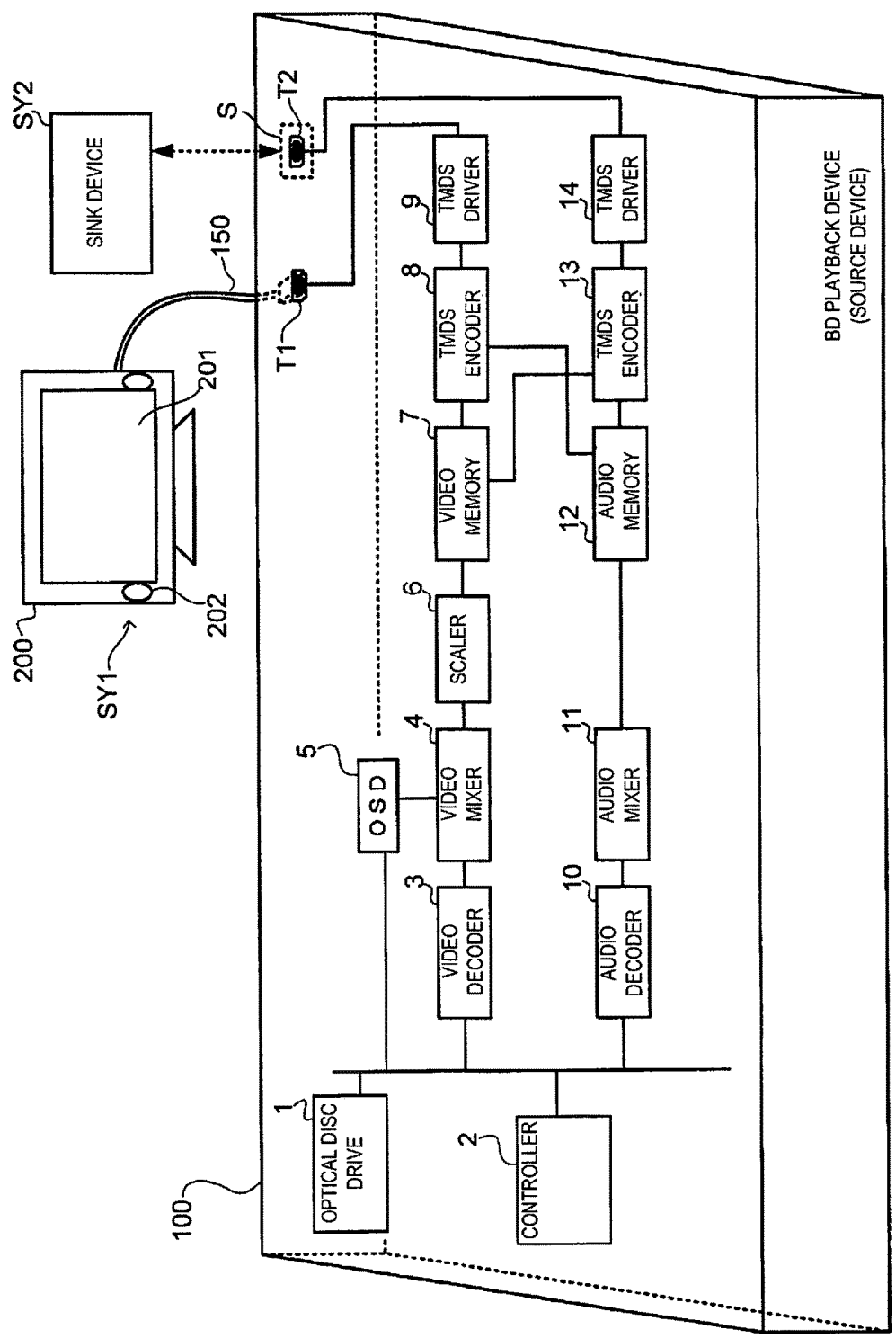
FIG. 1 is a block diagram showing a configuration of an audio/video transmission system in accordance with a first embodiment.

FIG. 1 is a block diagram showing a configuration of an audio/video transmission system in accordance with a first embodiment. The audio/video transmission system shown in FIG. 1 has a BD (Blu-ray Disc™) playback device 100 (e.g., a BD player), a television set 200, and a sink device SY2. The BD playback device 100 is a source device, and an example of an audio/video output device. The television set 200 is an example of a sink device SY1 (e.g., an audio/video input device).

Referring to FIG. 1, the BD playback device 100 will be described in detail. FIG. 1 illustrates a block diagram of a configuration inside a housing of the BD playback device 100. The BD playback device 100 has a function of playing a storage medium, such as a BD or a DVD, and outputting the played video and audio to the outside. In the illustrated embodiment, the BD playback device 100 has a main port T1 (e.g., a first output component) and a sub port T2 (e.g., a second output component). The main port T1 is an ordinary HDMI port (terminal) for outputting video and audio. Thus, the main port T1 is a terminal for video and audio output. The sub port T2 is an ordinary HDMI port (terminal) for basically outputting only audio out of the video and audio (i.e., an audio output port). Thus, the sub port T2 is a terminal for audio output. With the BD playback device 100, there is one main port and one sub port (i.e., dual HDMI outputs). However, there can be two or more of each.

In the illustrated embodiment, as shown in FIG. 1, the BD playback device 100 and the television set 200 are connected with an HDMI cable 150. Specifically, one end of the HDMI cable 150 is connected to the main port T1, while the other end of the HDMI cable 150 is connected to an HDMI port (not shown) of the television set 200. The video and audio played by the BD playback device 100 are transmitted from the main port T1 to the television set 200 via the HDMI cable 150. Then, the video is displayed on a display component 201 (e.g., a display) of the television set 200, and audio is emitted from a speaker 202 of the television set 200. Of course, the sink device SY1 connected to the main port T1 is not limited to the television set 200, and can be other types of devices, such as a monitor. Also, the sink device SY1 connected to the main port T1 is not limited to a device that supports video and audio input, and can be other types of devices that only support video input out of the video and audio.

When the BD playback device 100 is shipped from the factory, a sticker S is stuck on the front surface of the sub port T2 to cover the sub port T2 by the sticker S. Thus, the sub port T2 cannot be seen by a user. The sticker S tells the user that the sub port T2 is a dedicated audio HDMI port. The user can remove the sticker S to connect an HDMI cable to the sub port T2 to connect the sink device SY2 to the BD playback device 100.

In the illustrated embodiment, the sub port T2 is a dedicated audio HDMI port. Thus, a dedicated audio device, such as an amplifier, a speaker, and the like, which does not basically support video input, is connected to the sub port T2 using the HDMI cable. This allows the audio played by the BD playback device 100 to be transmitted from the sub port T2 to the dedicated audio device (the sink device SY2) via the HDMI cable. In the illustrated embodiment, the main port T1 and the sub port T2 have the same shape with respect to each other such that the same HDMI cable with the same connector is connectable to the main port T1 and the sub port T2. However, as mentioned above, the main port T1 and the sub port T2 are different from each other in that the sub port T2 is a dedicated audio HDMI port. Specifically, the sub port T2 is indicated as being a dedicated audio HDMI port by sticking the sticker S on the sub port T2 and/or using an indicator, such as a character string, a symbol, and the like. Furthermore, the main port T1 and the sub port T2 can be configured to support the same HDMI version. However, the sub port T2 can be configured to only support an older HDMI version than that of the main port T1 in case that the sub port T2 does not need to support video signal with higher resolution, such as 4K, for example.

As shown in FIG. 1, the BD playback device 100 comprises an optical disc drive 1, a controller 2, a video decoder 3, a video mixer 4, an OSD component 5, a scaler 6, a video memory 7, a TMDS encoder 8, a TMDS driver 9, an audio decoder 10, an audio mixer 11, an audio memory 12, a TMDS encoder 13, a TMDS driver 14, the main port T1, and the sub port T2.

The optical disc drive 1 plays a loaded BD or DVD, and outputs played video signals and audio signals. The video signal outputted from the optical disc drive 1 is inputted to the video decoder 3 and decoded by the video decoder 3. The decoded video signal is mixed by the video mixer 4 and then sent to the scaler 6. Of course, the optical disc drive 1 can be other types of playback devices that can play video content stored on a storage device internally or externally provided relative to the BD playback device 100. In the illustrated embodiment, the controller 2 basically includes a microcomputer or processor. The controller 2 can further include other conventional components such as an input interface circuit, an output interface circuit, and storage devices, such as a ROM (Read Only Memory) device and a RAM (Random Access Memory) device, flash memory, etc. For example, the internal RAM of the controller 2 stores processing results of the controller 2. The internal ROM of the controller 2 stores the information and programs for various operations. It will be apparent to those skilled in the field of audio/video output devices from this disclosure that the precise structure and algorithms for the controller 2 can be any combination of hardware and software that will carry out the functions of the BD playback device 100 as described herein.

The scaler 6 is an electronic device that performs resolution conversion processing on the inputted video signal. For example, the scaler 6 outputs the video signal inputted at the resolution of 4K as it is with a resolution of 4K, or outputs the video signal that has been converted to a resolution of 2K. 2K is a resolution corresponding to image quality in so-called HDTV of 1920×1080=approximately 2 million pixels. 4K is a resolution of 3840×2160=approximately 8 million pixels, which is four times the resolution of 2K, and corresponds to image quality exceeding that of HDTV. The video memory 7 stores the video signal outputted from the scaler 6.

The audio signal outputted from the optical disc drive 1 is inputted to the audio decoder 10 and decoded by the audio decoder 10. The decoded audio signal is mixed by the audio mixer 11 and then sent to the audio memory 12. The audio memory 12 stores the audio signal that is sent.

The video signal stored in the video memory 7 and the audio signal stored in the audio memory 12 are inputted to the TMDS encoder 8. The TMDS encoder 8 converts the inputted video and audio signals into TMDS (transition minimized differential signaling) data. TMDS is a transmission system for video and audio, and has three data channels and one clock channel. The TMDS data is transmitted through the TMDS driver 9 from the main port T1 to the external sink device SY1. The sink device SY1 is connected to the main port T1 by an HDMI cable. The sink device SY1 is, for example, a device that supports at least video input, such as the monitor or the television set 200 shown in FIG. 1.

The sink device SY2 can be connected to the sub port T2, which is a dedicated audio HDMI port, via HDMI cable.

When a sink device SY2 that does not support video input is connected to the sub port T2, the audio signal stored in the audio memory 12 is converted into TMDS data by the TMDS encoder 13, and TMDS data can be transmitted from the sub port T2 via the TMDS driver 14 to the sink device SY2.

The entire storage area (memory area) of the video memory 7 is basically allocatable for the main port T1. However, as will be discussed below, at least part of the storage area can be allocated for the sub port T2 in some cases. In this case, the video signal stored in the above-mentioned area of the video memory 7 is converted into TMDS data by the TMDS encoder 13 and transmitted from the sub port T2 to the sink device SY2 via the TMDS driver 14.

Also, communication between the BD playback device 100, which is a source apparatus, and the sink device is performed using DDC (display data channel) and CEC (consumer electronics control), in addition to the TMDS data, by the HDMI connections between the sink device SY1 and the main port T1 and between the sink device SY2 and the sub port T2. EDID (extended display identification data) information, which is information about the configuration, state, and so forth of the sink device, can be transmitted to the BD playback device 100 using DDC. Also, complicated control between devices can be performed using CEC.

Also, the OSD component 5 generates an OSD (on-screen display) video signal and outputs it to the video mixer 4. At the video mixer 4, it is possible to superimpose an OSD video signal over the video signal inputted from the video decoder 3. The controller 2 controls the various components of the BD playback device 100. Basically, the video decoder 3, the video mixer 4, the OSD component 5, the scaler 6, the video memory 7, the TMDS encoder 8, the TMDS driver 9, the audio decoder 10, the audio mixer 11, the audio memory 12, the TMDS encoder 13 and the TMDS driver 14 can include conventional configuration and be formed of conventional electrical circuits or circuitry, for example, and thus detailed descriptions of the configurations will not be omitted for the sake of brevity.

1.2 Control Processing in Source Device

As discussed above, the main port T1 and the sub port T2, which are HDMI ports, are disposed on the back of the BD playback device 100 (the source device). Thus, the user have to fumble around to connect the sink device to the HDMI port with the HDMI cable. In this case, a sink device (television set or the like) supporting video input can be mistakenly connected to the sub port T2 although it is supposed to be connected to the main port T1.

Also, after the sticker S that covers the sub port T2 is peeled off, it is hard to tell that the sub port T2 is a dedicated audio HDMI port. Thus, the user can mistakenly connect a sink device that supports video input to the sub port T2.

In view of this, in this embodiment, if this should happen, there is a function of notifying the user that the connection is wrong. This function will now be described in detail. The control processing in the BD playback device 100 will be described with reference to the flowchart shown in FIG. 2.

Figure 2:
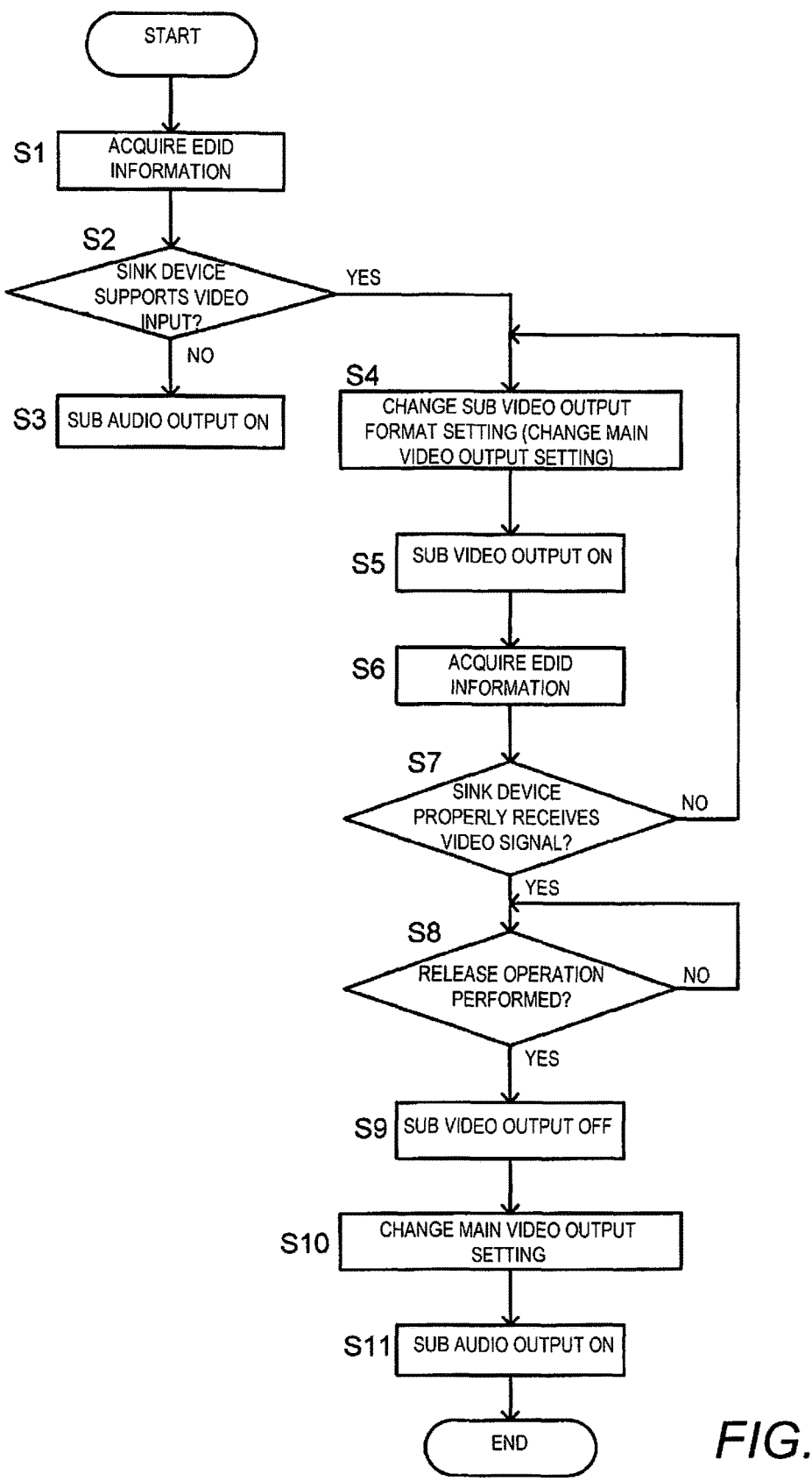
FIG. 2 is a flowchart showing a control process in a BD playback device in accordance with the first embodiment.

When the sink device SY2 is connected to the sub port T2 by HDMI cable, once this is detected, the processing of FIG. 2 is commenced. Although not shown in FIG. 2, when the processing starts, the controller 2 allocates the audio memory 12 for the sub-port T2.

First, in step S1, the controller 2 acquires EDID information (an example of identification information) via the sub port T2 by communication from the connected sink device SY2. Then, in step S2, the controller 2 determines whether or not the sink device SY2 supports video input based on the acquired EDID information. If the sink device SY2 does not support video input (No in step S2), then the flow proceeds to step S3. Specifically, in step S3, the controller 2 outputs the audio signal stored in the audio memory 12 from the sub port T2 to the sink device SY2 via the TMDS encoder 13 and the TMDS driver 14. This makes it possible to input audio to the sink device SY2 (amplifier, speaker, etc.), which is a dedicated audio device. In the illustrated embodiment, EDID information is utilized as an example of identification information. However, other types of metadata to describe capabilities of the sink device SY2 can be utilized to determine whether or not the sink device SY2 supports video input.

On the other hand, if the sink device SY2 supports video input (Yes in step S2), then the flow proceeds to step S4. In step S4, the controller 2 specifies a predetermined video output format supported by the connected sink device SY2 based on the EDID information acquired in step S1. Then, the setting of the scaler 6 and the allocation of the storage area of the video memory 7 are carried out according to the specified video output format. Examples of the video output format here include the resolution, scanning method (interlace or progressive), refresh rate (frame rate), dynamic range (HDR), and color space expression method (RGB or YCbCr). All of these affect the amount of memory that is used. In the following description of the embodiment, as an example, it is assumed that the video output format is resolution, scanning method, and refresh rate.

Figure 3A:
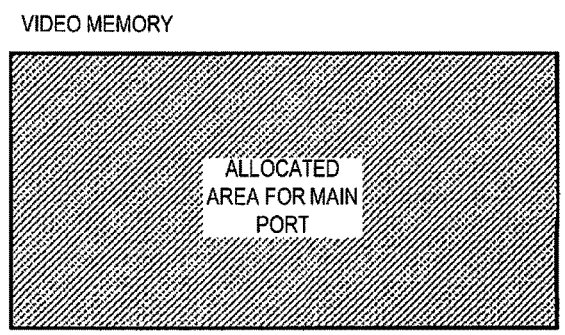
FIG. 3A illustrates tables showing connection states of HDMI ports and resource allocation states, and a schematic diagram showing a memory area of a video memory in accordance with the first embodiment.

The allocation of the storage area of the video memory 7 will now be described. FIG. 3A illustrates a table showing HDMI ports, the sink devices connected to these HDMI ports and the signals outputted from those ports, a table showing where the audio memory 12 and the audio mixer 11 are allocated, and a diagram showing an allocation state of the storage area in the video memory 7. The same applies to FIGS. 3B to 3D (discussed below).

FIG. 3A shows a state in which the sink device SY1 (a television set) is connected to the main port T1, and no sink device SY2 is connected to the sub port T2. In this case, the entire storage area of the video memory 7 is allocated for the main port T1. The storage area of the video memory 7 is an area corresponding to 4K, which is the maximum resolution that the BD playback device 100 can output. Both the audio memory 12 and the audio mixer 11 are allocated for the main port T1. Consequently, the 4K video signal stored in the video memory 7 and the audio signal stored in the audio memory 12 are transmitted from the main port T1 to the sink device SY1 via the TMDS encoder 8 and the TMDS driver 9. Consequently, with the sink device SY1 (a television set), video at 4K are displayed and audio is generated.

Figure 3B:
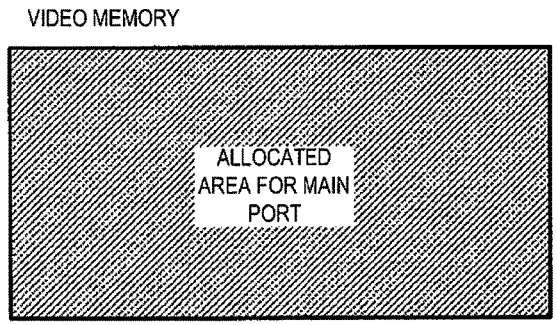
FIG. 3B illustrates tables showing connection states of HDMI ports and resource allocation states, and a schematic diagram showing a memory area of a video memory in accordance with the first embodiment.

FIG. 3B shows a state in which the sink device SY1 (a television set) is connected to the main port T1, and the sink device SY2 (an amplifier) is connected to the sub port T2. In this case, the entire storage area of the video memory 7 is allocated for the main port T1. Also, the start of processing in FIG. 2 causes the audio memory 12 to be allocated for the sub port T2 (step S3). Consequently, the 4K video signal stored in the video memory 7 is transmitted from the main port T1 to the sink device SY1 through the TMDS encoder 8 and the TMDS driver 9. Consequently, video at 4K is displayed on the sink device SY1 (a television set). Also, in step S3, the audio signal stored in the audio memory 12 is transmitted from the sub port T2 to the sink device SY2 via the TMDS encoder 13 and the TMDS driver 14. Consequently, audio is inputted to the sink device SY2 (an amplifier).

Figure 3C:
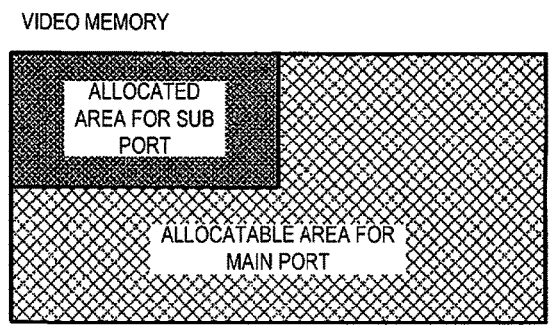
FIG. 3C illustrates tables showing connection states of HDMI ports and resource allocation states, and a schematic diagram showing a memory area of a video memory in accordance with the first embodiment.

FIG. 3C shows a state in which no sink device SY1 is connected to the main port T1, and the television set (the sink device SY2) supporting video input is connected to the sub port T2. In this case, in step S4, part of the storage area of the video memory 7 is allocated to the sub port T2 supporting 1080p (2K progressive), which is an example of the predetermined video output format supported by the sink device SY2. That is, part of the storage area of the video memory 7 for the main port T1 is allocated for the sub port T2, and the remaining area can be used for the main port T1. Consequently, the performance of video output for the main port T1 with respect to the video output format is limited. The start of the processing in FIG. 2 causes the audio memory 12 to be allocated for the sub port T2.

After allocating the video memory 7 as shown in FIG. 3C, for example, the flow proceeds to step S5. In step S5, the controller 2 uses the scaler 6 and the allocated area of the video memory 7 to transmit an OSD video signal of the above-mentioned predetermined video output format from the sub port T2 to the sink device SY2 via the TMDS decoder 13 and the TMDS driver 14.

Figure 4:
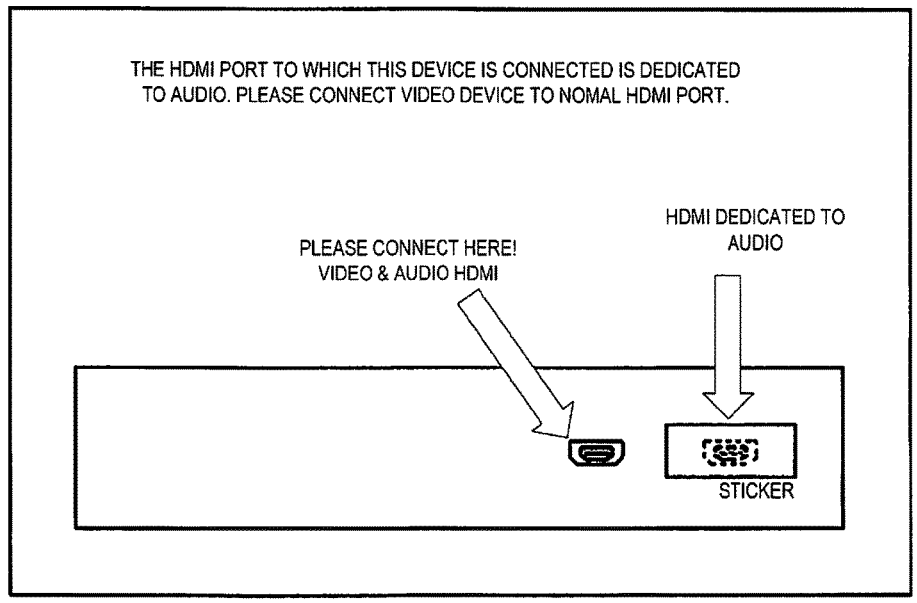
FIG. 4 is a diagram showing an example of a screen for notifying a user.

Here, the notification screen shown in FIG. 4, for example, is displayed on the sink device SY2 by the OSD video signal. In the example in FIG. 4, the notification screen is a notification screen indicating that the sub port T2 to which the sink device SY2 is connected is dedicated to audio, and prompting the user to connect the sink device SY2 (a video device) to the main port T1.

Next, the flow proceeds to step S6. In step S6, the controller 2 again acquires EDID information from the sink device SY2 via the sub port T2. In step S7, the controller 2 then determines whether or not the sink device SY2 is properly receiving the video, based on the acquired EDID information.

If the video reception at the sink device SY2 is not proper (No in step S7), then the flow returns to step S4. Then, the controller 2 changes the video output format for which the sink device SY2 is supporting based on the EDID information, and performs allocation of the video memory 7, etc., using the changed video output format.

Figure 3D:
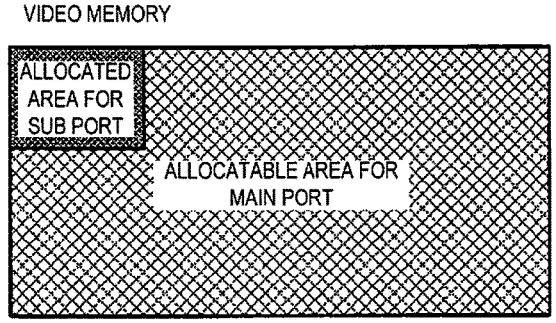
FIG. 3D illustrates tables showing connection states of HDMI ports and resource allocation states, and a schematic diagram showing a memory area of a video memory in accordance with the first embodiment.

For example, FIG. 3D shows a case in which the 1080p video output format shown in FIG. 3C is changed to the 480i (SDTV interlaced) video output format. In this case, the area allocated for the sub port T2 in the storage area of the video memory 7 (e.g., the allocation amount of the video memory 7) is made smaller than in the case in FIG. 3C. As a result, the area that is allocatable for the main port T1 in the video memory 7 can be increased as compared with FIG. 3C.

After step S4, the processing from step S5 onward is performed in the same manner as described above, and the video output format is changed in step S4 until video reception becomes proper in step S7. Once video is properly received in step S7 (Yes in step S7), then the flow proceeds to step S8.

In step S8, the controller 2 determines whether a predetermined release operation has been performed. The release operation is, for example, an operation such as pressing a predetermined key on the remote control (not shown) for remotely and externally controlling the BD playback device 100. The release operation is performed when the sink device SY2 is an amplifier or the like that is supporting video input. More specifically, if this amplifier is connectable to a display device along with the source device, then EDID information indicative of video input support is outputted from the amplifier to the source device in some cases. In this case, in step S2, it is determined that the sink device SY2 supports video input according to the EDID information although the user does not accidentally or mistakenly connect the sink device SY2 (amplifier) to sub port T2. Thus, the OSD video signal for the above-mentioned notification screen is outputted from the BD playback device 100.

In response, since the user has not mistakenly connected the sink device SY2 to the sub port T2 in this case, the user performs the above-mentioned release operation. Until the release operation is performed, the system is in a standby state (No in step S8). Once the release operation is performed (Yes in step S8), then the flow proceeds to step S9. In step S9, the controller 2 stops the output of the OSD video signal from the sub port T2. Then, the flow proceeds to step S10. In step S10, the controller 2 changes the setting such that the entire storage area of the video memory 7 is made allocatable for the main port T1. Then, the flow proceeds to step S11. In step S11, the controller 2 causes the audio signal stored in the audio memory 12 to be outputted from the sub port T2 to the sink device SY2 via the TMDS encoder 13 and the TMDS driver 14. Processing is completed in step S11.

Also, if a sink device SY2 supporting video input (a television set, etc.) has been mistakenly connected to the sub port T2, then the user can look at the notification screen displayed on the sink device SY2 and can unplug the HDMI cable connected to the sink device SY2 from the sub port T2 to reconnect the sink device SY2 to the main port T1. Thus, in the standby state in step S8, if it is detected that the sub port T2 and the sink device SY2 have been disconnected, then the controller 2 can further stop the output of the OSD video signal from the sub port T2, in addition to the processing shown in FIG. 2. Then, the controller 2 changes the setting such that the entire storage area of the video memory 7 is made allocatable for the main port T1. Of course, instead of performing this detection of the disconnection separately from the detection of the release operation in step S8, this detection of the disconnection can be performed as a part of the detection of the release operation. In other words, in step S8, the controller 2 can determine whether or not the release operation is performed or the sub port T2 and the sink device SY2 are disconnected. Then, if the release operation is performed or the sub port T2 and the sink device SY2 are disconnected, then the flow proceeds to step S9.

With this embodiment, even if a sink device SY2 supporting video input is accidentally connected to the dedicated audio sub port T2, part of the storage area of the video memory 7 for the main port T1 can be temporarily allocated for the sub port T2. This allows the OSD video signal for the notification screen to be outputted to the sink device SY2, and allows the user to be alerted that the connection is wrong. Therefore, the user is less likely to mistakenly think that a malfunction or the like has occurred. This effect can be achieved without adding any particular hardware resources, which keeps the cost low. Also, this means that the sub port T2 does not have to be covered with a sticker at the factory, so that sticker can be eliminated.

In this embodiment, in particular, it is determined whether video is properly received by the sink device SY2 while changing the setting of video output format for the sub port T2. Thus, the OSD video signal for the notification screen can be outputted to the sink device SY2 with the video output format once the video reception becomes proper. Therefore, the user more will more reliably see the notification screen.

In the illustrated embodiment, the controller 2 is configured to allocate at least part of the storage area of the video memory 7 to the sub port T2 in response to determining that the sink device SY2 connected to the sub port T2 supports video input.

In the illustrated embodiment, the controller 2 is configured to temporarily allocate at least part of the storage area that has been allocated to the main port T1 to the sub port T2, and configured to output the OSD video signal (e.g., predetermined video signal) from the sub port T2 using the allocated part of the storage area.

In the illustrated embodiment, the controller 2 is configured to change the video output format setting based on the EDID information (e.g., information) acquired from the sink device SY2 about reception status of the OSD video signal at the sink device SY2 to output the OSD video signal.

In the illustrated embodiment, the controller 2 is configured to make all of the storage area allocatable to the main port T1 based on the predetermined operation while outputting the OSD video signal.

In the illustrated embodiment, the controller 2 is configured to make all of the storage area allocatable to the main port T1 in response to detecting the disconnection of the sink device SY2 relative to the sub port T2.

In the illustrated embodiment, the controller 2 is configured to output the audio signal from the sub port T2 in response to determining that the sink device SY2 does not support the video input (step S12).

In the illustrated embodiment, the controller 2 is configured to acquire the EDID information (e.g., identification information) of the sink device SY2 from the sink device SY2 in response to detecting that the sink device SY2 is connected to the sub port T2.

In the illustrated embodiment, the controller 2 is configured to determine whether the sink device SY2 supports the video input based on the EDID information.

In the illustrated embodiment, the controller 2 is configured to allocate the audio memory 12 to the main port T1 to output the audio signal from the main port T1 in response to determining that no sink device SY2 is connected to the sub port T2.

In the illustrated embodiment, the controller 2 is configured to change the video output format setting of the OSD video signal, and configured to determine the allocation amount of the video memory 7 to be allocated to the sub port T2 according to the video output format setting of the OSD video signal.

In the illustrated embodiment, the controller 2 is configured to output the OSD video signal from the sub port T2 to display on the sink device SY2 the notification screen indicating that the sub port T2 is dedicated to the audio output.

In the illustrated embodiment, the scaler 6 (e.g., the video scaler) is further provided that is configured to change the video output format of the OSD video signal.

2. Second Embodiment

Figure 5:
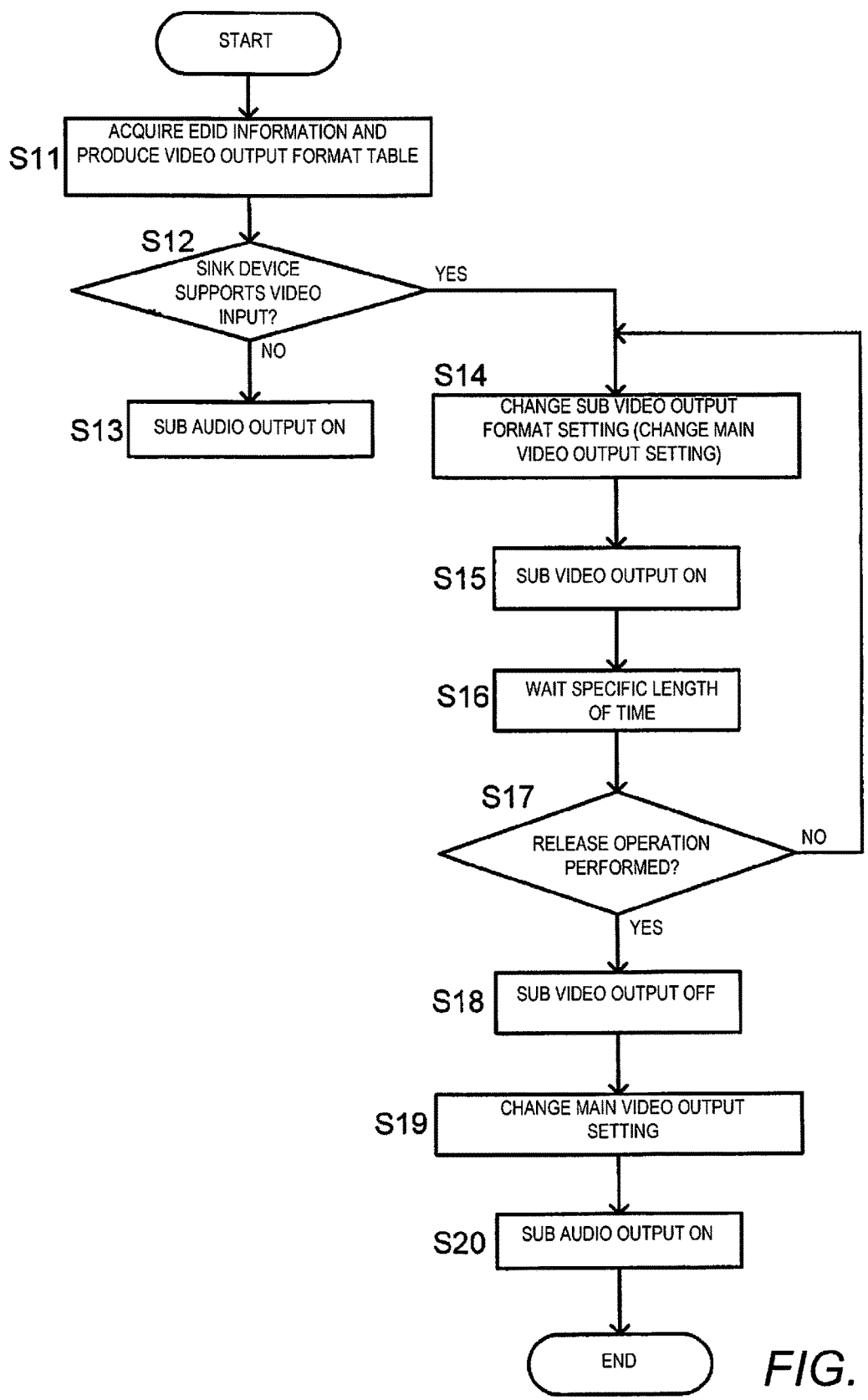
FIG. 5 is a flowchart showing a control processing in a BD playback device in accordance with a second embodiment.

Next, a second embodiment will now be described. The source device in this embodiment is configured the same as the BD playback device 100 in the first embodiment discussed above. FIG. 5 is a flowchart showing the control processing performed by the BD playback device 100 in this embodiment. The following description of the processing in accordance with the second embodiment will be focused on the differences from the processing in FIG. 2 in the first embodiment.

The processing in FIG. 5 starts when it is detected that the sink device SY2 is connected to the sub port T2, which is the same as in FIG. 2. In step S11, the controller 2 acquires EDID information from the sink device SY2 via the sub port T2.

In step S11, the controller 2 produces a video output format table made up of video output formats supported by the sink device SY2 based on the acquired EDID information. An example of the video output format table is shown in FIG. 6. In FIG. 6, the table is made up of six different settings of the video output formats supported by the sink device SY2. This video output format table does not necessarily have to be produced, and instead can be prepared and stored in advance as a fixed preset table having general settings of the video output formats, for example.

If the sink device SY2 is supporting video input in step S12 (Yes in step S12), then the flow proceeds to step S14. In step S14, the controller 2 selects a predetermined video output format included in the video output format table that has been produced. Then, the controller 2 further carries out a setting of the scaler 6 and an allocation of the storage area of the video memory 7 according to the selected video output format.

Next, in step S15, the controller 2 uses the scaler 6 and the allocated areas of the video memory 7 and transmits an OSD video signal in the above-mentioned predetermined video output format from the sub port T2, through the TMDS decoder 13 and the TMDS driver 14, to the sink device SY2. Then, the controller 2 waits for a predetermined length of time, and the flow proceeds to step S17. In step S17, the controller 2 determines whether a release operation has been performed. If it has not (No in step S17), then the flow returns to step S14. Here, the controller 2 selects another video output format besides the one in the previous step S14 included in the video output format table that has been produced, and allocates the storage area of the video memory 7.

After step S14, the processing from step S15 onward is carried out the same as discussed above, and the video output format is changed in step S14 until the release operation is performed in step S17. Just as in the first embodiment, when it is detected that the sub port T2 and the sink device SY2 have been disconnected, then the flow moves to processing not shown in FIG. 5, and the setting is changed such that the entire storage area of the video memory 7 is made allocatable for the main port T1. As in the first embodiment, this detection of the disconnection can be performed separately from the detection of the release operation in step S17. Of course, this detection of the disconnection can be performed as a part of the detection of the release operation. In other words, in step S17, the controller 2 can determine whether or not the release operation is performed or the sub port T2 and the sink device SY2 are disconnected. Then, if the release operation is performed or the sub port T2 and the sink device SY2 are disconnected, then the flow proceeds to step S18.

This embodiment provides the same effect as the first embodiment. In particular, in this embodiment, the notification screen is outputted in a loop while the selection of the video output format in the produced video output format table is changed at regular time intervals. Thus, the user is able to view the notification screen more reliably. In the first embodiment, the proper video reception is determined based on the EDID information. On the other hand, it is effective to adopt the processing in accordance with this embodiment when there is a possibility of an erroneous determination in the above-mentioned determination based on the EDID information due to an instability of the EDID information.

In the illustrated embodiment, the controller 2 is configured to change the video output format setting at the regular time interval to output the OSD video signal.

In the illustrated embodiment, the controller 2 is configured to change the video output format setting based on the EDID information acquired from the sink device SY2 about the video output format supported by the sink device SY2.

In the illustrated embodiment, the controller 2 is configured to repeatedly change the video output format setting of the OSD video signal until detecting the predetermined operation relative to the BD playback device 100.

In the illustrated embodiment, the controller 2 is configured to repeatedly change the video output format setting of the OSD video signal until detecting the disconnection of the sink device SY2 relative to the sub port T2.

3. Third Embodiment

Next, a third embodiment will now be described. This embodiment involves modifying the first embodiment or the second embodiment in terms of the control processing done by the BD playback device 100. Here, processing that is a modification of the second embodiment will be described through reference to the flowchart in FIG. 7.

Figure 7:
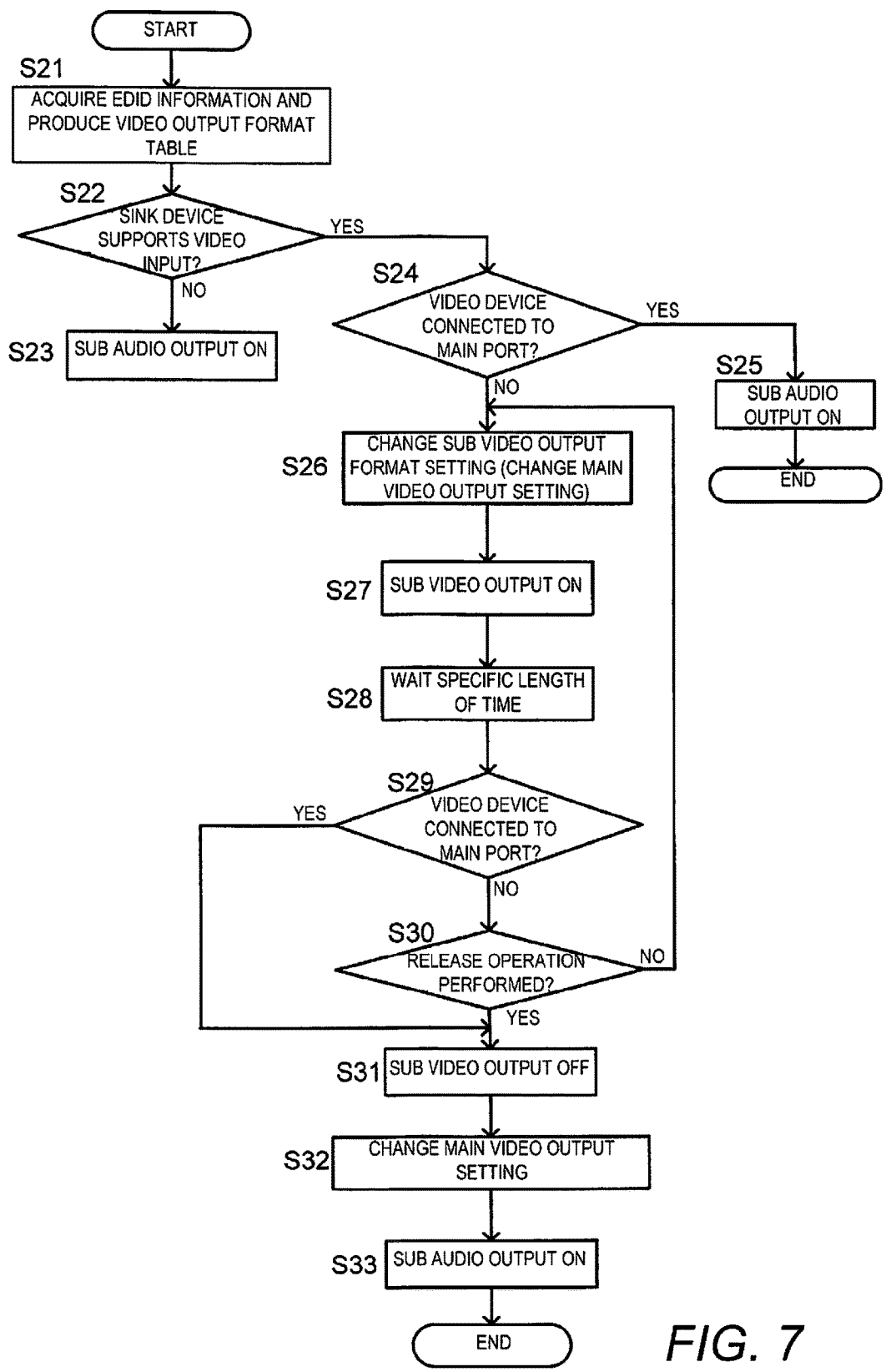
FIG. 7 is a flowchart showing a control processing in a BD playback device in accordance with a third embodiment.

Specifically, the processing in FIG. 7 is basically identical to the processing in FIG. 5, except that the processing in FIG. 7 includes steps S24, S25, and S29. In other words, steps S21-S23, S26-S28 and S30-S33 in FIG. 7 are basically identical to steps S11-S20 in FIG. 5, respectively, and thus will not be described again for the sake of brevity.

If the sink device SY2 is supporting video input in step S22 (Yes in step S22), then the flow proceeds to step S24. In step S24, the controller 2 determines whether a sink device SY1 (external video device) supporting video input is connected to the main port T1. If one is connected (Yes in step S24), then it is concluded that the sink device SY2 has not been mistakenly connected to the sub port T2, and the flow proceeds to step S25. In step S25, the controller 2 outputs the audio signal stored in the audio memory 12 from the sub port T2, through the TMDS encoder 13 and the TMDS driver 14, to the sink device SY2.

On the other hand, in step S24, if a sink device SY1 is not connected to the main port T1 (No in step S24), then the flow proceeds to step S26. In step S26, an allocation of the storage area of the video memory 7 for the sub port T2, etc., is performed. After a wait of a predetermined length of time in step S28, the flow proceeds to step S29. In step S29, the controller 2 determines whether a sink device SY1 supporting video input is connected to the main port T1. If one is not connected (No in step S29), then the flow proceeds to step S30. In step S30, it is determined whether a release operation has been performed.

When no sink device SY1 is connected to the main port T1 and no release operation is performed (No in step S29 and No in step S30), then the flow returns to step S26 and the setting of the video output format is changed. If a sink device SY1 is connected to the main port T1 in step S29 (Yes in step S29), or if a release operation has been performed in step S30 (Yes in step S30), then the flow proceeds to step S31. In step S31, the controller 2 stops the output of the OSD video signal from the sub port T2. Then, the flow proceeds to step S32. In step S32, the controller 2 changes the setting such that that the entire storage area of the video memory 7 is made allocatable for the main port T1. Then, the flow proceeds to step S33. In step S33, the controller 2 outputs the audio signal stored in the audio memory 12 from the sub port T2 to the sink device SY2 via the TMDS encoder 13 and TMDS driver 14. The processing is completed in step S33.

Just as in the second embodiment, when it is detected that the sub port T2 and the sink device SY2 have been disconnected, then the flow moves to processing not shown in FIG. 7 to change the setting such that the entire storage area of the video memory 7 is made allocatable for the main port T1.

This embodiment provides the same effect as the first embodiment. In particular, in this embodiment, by performing determination in step S24, if the sink device SY1 has already been connected to the main port T1 when the sink device SY2 is connected to the sub port T2, then audio can be outputted from the sub port T2 to the sink device SY2 since it can be concluded that the sink device SY2 is not mistakenly connected. Also, by performing determination in step S29, if the sink device SY1 is connected to the main port T1 after the sink device SY2 is connected to the sub port T2, then audio can be outputted from the sub port T2 to the sink device SY2 since it can be concluded that the sink device SY2 is not mistakenly connected.

In the illustrated embodiment, the controller 2 is configured to output the audio signal from the sink device SY2 without allocating the storage area of the video memory 7 to the sub port T2 while a sink device SY1 (e.g., an external video device) is connected to the main port T1.

In the illustrated embodiment, the controller 2 is configured to make all of the storage area of the video memory 7 allocatable to the main port T1 in response to detecting the connection of the sink device SY1 (e.g., the external video device) relative to the main port T1 while outputting the OSD video signal.

4. Fourth Embodiment

Next, a fourth embodiment will now be described. The source device in this embodiment is the BD playback device 100 having the configuration shown in FIG. 1. However, the control method is different from those in the first to third embodiments.

Here, in this embodiment, the main port T1 conforms to HDMI 2.0 that supports 4K, and the sub port T2 conforms to HDMI 1.4 that does not support 4K, but supports 2K. In this embodiment, when the sink device SY2 is connected to the sub port T2, the controller 2 determines whether the video output format supported by the sink device SY2 is supported by the sub port T2 that conforms to HDMI 1.4, based on the EDID information or the like acquired from the sink device SY2. If the controller 2 determines that the video output format is supported by the sub port T2, then the controller 2 allocates the area corresponding to the above video output format in the storage area of the video memory 7 for the sub port T2, and make the remaining area unavailable for the main port T1.

Figure 8A:
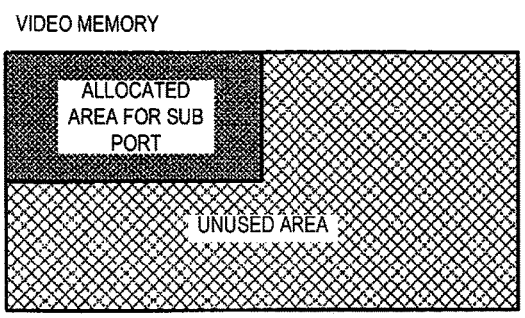
FIG. 8A illustrates tables showing connection states of HDMI ports and resource allocation states, and a schematic diagram showing a memory area of a video memory in accordance with a fourth embodiment.

For example, FIG. 8A shows a state in which no sink device SY1 is connected to the main port T1, and the sink device SY2 (a television set) supporting the 1080p video output format is connected to the sub port T2. In this case, since the 1080p video output format is supported by HDMI 1.4, the area corresponding to the 1080p video output format in storage areas of the video memory 7 is allocated for the sub port T2, and the remaining area is made unavailable for the main port T1. That is, the right to use the video memory 7 is switched from the main port T1 to the sub port T2. Also, the audio memory 12 is allocated to the sink device SY2. Consequently, the video signal stored in the video memory 7 and the audio signal stored in the audio memory 12 are transmitted from the sub port T2 to the sink device SY2 via the TMDS encoder 13 and the TMDS driver 14.

Consequently, even when the sink device SY2 is accidentally connected to the sub port T2, video and audio can be outputted to the sink device SY2 just as they are, thereby improving user convenience.

Figure 8B:
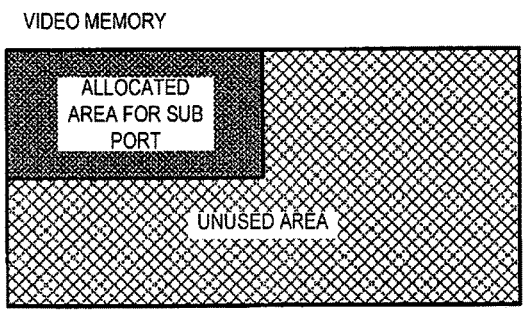
FIG. 8B illustrates tables showing connection states of HDMI ports and resource allocation states, and a schematic diagram showing a memory area of a video memory in accordance with the fourth embodiment.

Also, when the state shown in FIG. 8A is changed to a state in which the sink device SY1 (amplifier) is further connected to the main port T1 as shown in FIG. 8B, for example, then the controller 2 can allocate the audio memory 12 to the main port T1 while the right to use the video memory 7 is switched to the sub port T2. In this case, the audio signal stored in the audio memory 12 can be outputted from the main port T1 to the sink device SY1 via the TMDS encoder 8 and the TMDS driver 9. That is, just audio can be outputted from the main port T1.

In the illustrated embodiment, the controller 2 is configured to allocate the at least part of the storage area of the video memory 7 to the sub port T2 and switch the right to use of the video memory 7 from the main port T1 to the sub port T2 in response to determining that the video output format supported by the sink device SY2 is supported by the sub port T2.

In the illustrated embodiment, the controller 2 is configured to switch the right to use and allow the main port T1 to output only the audio signal.

Embodiments of the present invention are described above, but various modifications to these embodiments are possible within the scope of the gist of the present invention.

For example, in step S4 in FIG. 2, or in step S14 in FIG. 5, the allocation of the storage area of the video memory 7 for the sub port T2 need not be performed every time the video output format is changed. Instead, an area corresponding to the video output format at which the largest amount of memory is used out of all the video output format candidates can be allocated just one time. Consequently, the notification screen can be outputted while changing the video output format, even though the allocation is not changed.

In the illustrated embodiments, the BD playback device 100 is discussed as an example of a source device. However, the source device is not limited to the BD playback device 100, and can be other types of devices from which data is originated, such as a BD recorder, a HDD recorder, a set-top box, and the like. Also, the television set 200 is discussed as an example of a sink device. However, the sink device can also be other types of destination devices that receives data over communications with a source device, such as a display having a speaker, and the like.

[1] In view of the state of the known technology and in accordance with a first aspect, an audio/video output device comprises a first output component for video and audio output, a second output component for audio output, a video memory, and a controller. The video memory is configured to store video signal. The controller is configured to allocate at least part of an area of the video memory to the second output component in response to determining that an external device connected to the second output component supports video input.

With this configuration, the first output component can be configured to output video and audio. The second output component can be configured to output only the audio of the video and audio. With this configuration, even when a user mistakenly connects a video device supporting video input to the second output component dedicated for audio, at least the part of a storage area of the video memory is allocated to the second output component. Thus, it is possible to output video from the second output component, and the user will be less likely to mistakenly conclude that a malfunction has occurred, etc. Therefore, user convenience can be improved.

[2] In accordance with a preferred embodiment according to the audio/video output device, the controller is configured to temporarily allocate at least part of the area that has been allocated to the first output component to the second output component, and configured to output predetermined video signal from the second output component using the allocated part of the area.

With this configuration, by outputting the predetermined video signal from the second output component to the external device while allowing the video output from the first output component, the user can be notified that the connection is incorrect.

[3] In accordance with a preferred embodiment according to any one of the audio/video output devices, the controller is configured to change video output format setting based on information acquired from the external device about reception status of the predetermined video signal at the external device to output the predetermined video signal.

With this configuration, the predetermined video signal can be outputted in the video output format in which the external device properly received the video. Thus, the user can be notified more reliably.

[4] In accordance with a preferred embodiment according to any one of the audio/video output devices, the controller is configured to change video output format setting at a regular time interval to output the predetermined video signal.

With this configuration, the external device can properly receive the predetermined video signal in a certain video output format setting. Thus, the user can be notified more reliably.

[5] In accordance with a preferred embodiment according to any one of the audio/video output devices, the controller is configured to change the video output format setting based on information acquired from the external device about a video output format supported by the external device.

With this configuration, the predetermined video signal can be properly received more quickly according to the external device. Thus, the user can be notified sooner.

[6] In accordance with a preferred embodiment according to any one of the audio/video output devices, the controller is configured to make all of the area allocatable to the first output component based on a predetermined operation while outputting the predetermined video signal.

With this configuration, if the connection of the external device to the second output component is not wrong, the user can perform a predetermined operation, which eliminates the restriction on the video output for the first output component.

[7] In accordance with a preferred embodiment according to any one of the audio/video output devices, the controller is configured to make all of the area allocatable to the first output component in response to detecting a disconnection of the external device relative to the second output component.

With this configuration, if the user is alerted by notification by the predetermined video signal that the connection is wrong, and disconnects the external device from the second output component, then the restriction on video output for the first output component can be eliminated.

[8] In accordance with a preferred embodiment according to any one of the audio/video output devices, the controller is configured to output audio from the second output component without allocating the area to the second output component while an external video device is connected to the first output component.

With this configuration, if an external video device has been connected to the first output component when an external device is connected, then it is concluded that the connection of the external device to the second output component is not wrong, and audio can be outputted to the external device without any limitations on the video output for the first output component.

[9] In accordance with a preferred embodiment according to any one of the audio/video output devices, the controller is configured to make all of the area allocatable to the first output component in response to detecting a connection of the external video device relative to the first output component while outputting the predetermined video signal.

With this configuration, if no external video device is connected when the external device is connected, but an external video device is subsequently connected, then it is concluded that the connection of the external device to the second output component is not wrong, and the limitation of the video output for the first output component can be eliminated.

[10] In accordance with a preferred embodiment according to any one of the audio/video output devices, the controller is configured to allocate the at least part of the area to the second output component and switch a right to use of the video memory from the first output component to the second output component in response to determining that a video output format supported by the external device is supported by the second output component.

With this configuration, even when an external device is accidentally connected to the second output component, the correct video can be automatically outputted to the external device. Thus, the user does not have to reconnect the cable, and user convenience can be improved.

[11] In accordance with a preferred embodiment according to any one of the audio/video output devices, the controller is configured to switch the right to use and allow the first output component to output only audio signal.

With this configuration, it is possible to output audio to a device connected to the first output component while outputting video to an external device connected to the second output component.

[12] In accordance with a preferred embodiment according to any one of the audio/video output devices, the controller is configured to output audio signal from the second output component in response to determining that the external device does not support the video input.

In accordance with a preferred embodiment according to any one of the audio/video output devices, the controller is configured to acquire identification information of the external device from the external device in response to detecting that the external device is connected to the second output component.

[13] In accordance with a preferred embodiment according to any one of the audio/video output devices, the controller is configured to acquire identification information of the external device from the external device in response to detecting that the external device is connected to the second output component, and the controller is configured to determine whether the external device supports the video input based on the identification information.

[14] In accordance with a preferred embodiment according to any one of the audio/video output devices, the audio/video output device further comprises an audio memory configured to store audio signal. The controller is configured to allocate the audio memory to the first output component to output the audio signal from the first output component in response to determining that no external device is connected to the second output component.

[15] In accordance with a preferred embodiment according to any one of the audio/video output devices, the controller is configured to change video output format setting of the predetermined video signal, and configured to determine an allocation amount of the video memory to be allocated to the second output component according to the video output format setting of the predetermined video signal.

[16] In accordance with a preferred embodiment according to any one of the audio/video output devices, the controller is configured to output the predetermined video signal from the second output component to display on the external device a screen indicating that the second output component is dedicated to the audio output.

[17] In accordance with a preferred embodiment according to any one of the audio/video output devices, the controller is configured to repeatedly change video output format setting of the predetermined video signal until detecting a predetermined operation relative to the audio/video output device.

[18] In accordance with a preferred embodiment according to any one of the audio/video output devices, the controller is configured to repeatedly change video output format setting of the predetermined video signal until detecting a disconnection of the external device relative to the second output component.

[19] In accordance with a preferred embodiment according to any one of the audio/video output devices, the audio/video output device further comprises a video scaler configured to change video output format of the predetermined video signal.

With the audio/video output device, user convenience can be improved in a configuration having an output component dedicated for audio.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An audio/video output device comprising:
a first output component for video and audio output;
a second output component for audio output;
a video memory that stores video signal; and
a controller that determines whether an external device connected to the second output component supports video input, and
the controller allocating at least part of an area of the video memory to the second output component and outputting predetermined video signal from the second output component to display on the external device connected to the second output component a screen indicating that the second output component is dedicated to the audio output in response to determining that the external device connected to the second output component supports the video input.

2. The audio/video output device according to claim 1, wherein
the controller temporarily allocates at least part of the area that has been allocated to the first output component to the second output component, and outputs the predetermined video signal from the second output component using the allocated part of the area.

3. The audio/video output device according to claim 2, wherein
the controller changes video output format setting based on information acquired from the external device about reception status of the predetermined video signal at the external device to output the predetermined video signal.

4. The audio/video output device according to claim 2, wherein
the controller changes video output format setting at a regular time interval to output the predetermined video signal.

5. The audio/video output device according to claim 4, wherein
the controller changes the video output format setting based on information acquired from the external device about a video output format supported by the external device.

6. The audio/video output device according to claim 2, wherein
the controller makes all of the area allocatable to the first output component based on a predetermined operation while outputting the predetermined video signal.

7. The audio/video output device according to claim 2, wherein
the controller makes all of the area allocatable to the first output component in response to detecting a disconnection of the external device relative to the second output component.

8. The audio/video output device according to claim 2, wherein,
the controller outputs audio signal from the second output component without allocating the area to the second output component while an external video device is connected to the first output component.

9. The audio/video output device according to claim 8, wherein
the controller makes all of the area allocatable to the first output component in response to detecting a connection of the external video device relative to the first output component while outputting the predetermined video signal.

10. The audio/video output device according to claim 1, wherein
the controller allocates the at least part of the area to the second output component and switch a right to use of the video memory from the first output component to the second output component in response to determining that a video output format supported by the external device is supported by the second output component.

11. The audio/video output device according to claim 10, wherein
the controller switches the right to use and allow the first output component to output only audio signal.

12. The audio/video output device according to claim 1, wherein
the controller outputs audio signal from the second output component in response to determining that the external device does not support the video input.

13. The audio/video output device according to claim 1, wherein
the controller acquires identification information of the external device from the external device in response to detecting that the external device is connected to the second output component, and
the controller determines whether the external device supports the video input based on the identification information.

14. The audio/video output device according to claim 1, further comprising
an audio memory that stores audio signal,
the controller allocates the audio memory to the first output component to output the audio signal from the first output component in response to determining that no external device is connected to the second output component.

15. The audio/video output device according to claim 2, wherein
the controller changes video output format setting of the predetermined video signal, and determines an allocation amount of the video memory to be allocated to the second output component according to the video output format setting of the predetermined video signal.

16. The audio/video output device according to claim 2, wherein
the controller repeatedly changes video output format setting of the predetermined video signal until detecting a predetermined operation relative to the audio/video output device.

17. The audio/video output device according to claim 2, wherein
the controller repeatedly changes video output format setting of the predetermined video signal until detecting a disconnection of the external device relative to the second output component.

18. The audio/video output device according to claim 2, further comprising a video scaler that changes video output format of the predetermined video signal.

* * * * *